Dec. 18, 1962 F. H. MUELLER 3,068,724
SERVICE T WITH BUILT-IN VALVE AND DRILLING MECHANISM
Filed Oct. 9, 1959 2 Sheets-Sheet 1

INVENTOR
FRANK H. MUELLER

BY Cushman, Darby & Cushman
ATTORNEYS

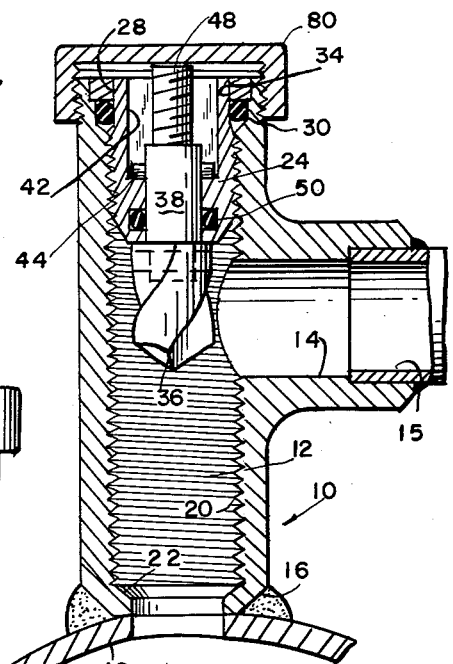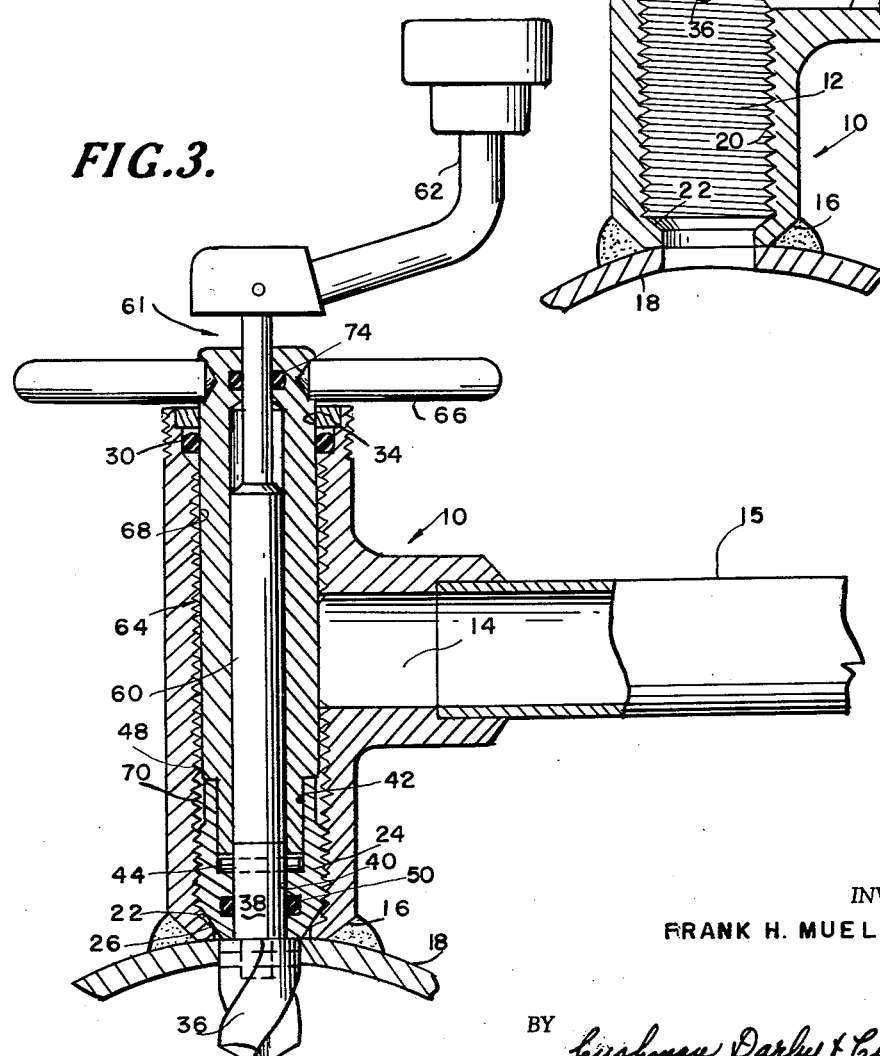

United States Patent Office 3,068,724
Patented Dec. 18, 1962

3,068,724
SERVICE T WITH BUILT-IN VALVE AND
DRILLING MECHANISM
Frank H. Mueller, Decatur, Ill., assignor to Mueller Co.,
Decatur, Ill., a corporation of Illinois
Filed Oct. 9, 1959, Ser. No. 845,550
14 Claims. (Cl. 77—37)

This invention relates to a metallic service T, and more particularly to an improved metallic self-tapping service T attachable to a metallic main carrying fluid under pressure for connecting a metallic service pipe to the main without escape of fluid to the atmosphere during the connecting process.

In United States Patent No. 2,839,075 there is disclosed a plastic self-tapping service T attachable to plastic mains, which have recently come into use for gas distribution. This invention is an improvement over my prior patent, and relates to metallic service T's having means mounted therein to tap a metallic main. The problems encountered in tapping a metallic main are much different and more extensive than the problems encountered in tapping a plastic main, but the present invention successfully solves the problems attendant the tapping of a metallic main by a self-tapping service T.

Previously, the installation of a service T upon a metallic gas main, or other metallic main carrying fluid under pressure, was an elaborate proces necessitating the use of several tools. In the patent to Smith No. 2,756,486 there is disclosed one method currently employed to secure a service T to a metallic main carrying fluid under pressure without allowing the escape of said fluid during the connecting process. Briefly, that method required the use of a drilling machine for drilling a hole in the main and then a machine for threading the service T onto the main, while employing a valve through which the drilling tool operates to prevent any escape of the fluid under pressure. After the main was tapped, the drilling tool had to be withdrawn through the valve and then a plug inserted through the valve and threaded into the service T to prevent the escape of fluid therefrom after the valve was removed.

This invention eliminates the necessity of using the elaborate tapping and plugging apparatus disclosed in the Smith patent, and similar equipment disclosed in many other patents, in that it provides a service T having a plug which carries a tapping tool mounted within the T and sealing means to prevent the escape of fluid under pressure in the main during the tapping operation and subsequently when the T is in operative connection The plug of the present invention serves to carry the tapping tool and also serves as a permanent plug when the tapping operation has been completed, thus eliminating the steps of tapping through a valve, removing the tapping tool, and then inserting a plug through the valve.

It is an object, therefore, of this invention to provide a metallic service T attachable to metallic mains carrying fluid under pressure, in which the T has self-contained means for tapping the main without the escape of fluid to the atmosphere, which tapping means also serves as a valve to shut off flow through the T from the main to a service pipe.

It is a further object of this invention to provide a tool for detachably engaging and operating the above-mentioned tapping and valve means.

These and further objects and advantages will become readily apparent to those skilled in the art upon reading the following detailed description taken in conjunction with the appended drawings in which:

FIGURE 3 is a view corresponding to FIG. 1 but showing the plug and drilling means in the position assumed after the main has been tapped and also in position to shut off flow through the T; and FIGURE 4 is a view corresponding to FIGURE 3, but showing the parts in the position assumed after service has been established.

Figure 1:
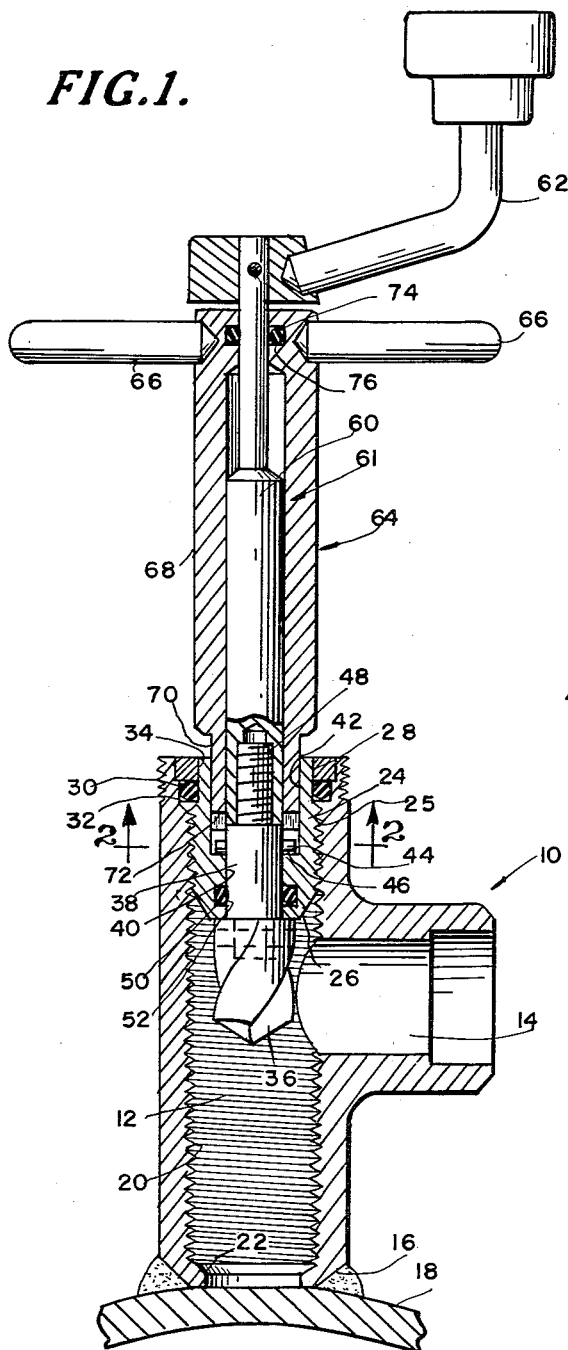
FIGURE 1 is a vertical sectional view through a service T, and associated tool, embodying this invention and showing the same secured to a main before the latter has been tapped.
Figure 2:
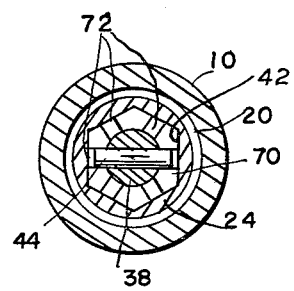
FIGURE 2 is a cross-sectional view taken along line 2—2 of FIG. 1.

Referring now to the drawings, FIG. 1 shows the preferred embodiment of a steel service T 10 having a through bore 12 and a lateral outlet 14. The T 10 at its lower or inlet end 16 is adapted to be welded to a conventional manner to a metallic main 18. The through bore 12 of the T is provided with interior threads 20 substantially throughout its entire length, save at the inlet end 16 which is provided wtih an interior restriction having a frusto-conical inwardly facing surface forming a valve seat 22.

Threadedly engaged within the through bore 12 of the T 10 is a plug 24 having a tapered forward or lower end 26 adapted to make sealing engagement with the aforementioned interior valve seat 22. The upper or outer end of the plug 24 is provided with a smooth-walled exterior cylindrical surface 28 adapted to make sealing engagement with an O-ring 30 disposed in a circumferential groove 32 in the T through bore 12 at its upper end. Upwardly beyond the O-ring 30 the through bore 12 is reduced to an axially short smooth-walled portion 34 of a diameter somewhat smaller than the crest diameter of the bore threads 20. The smooth-walled portion 34, which may be formed by a separate inserted part for manufacturing reasons, and the interior valve seat 22 serve as stops or limiting means for the axial movement of the plug 24 at both ends of the through bore 12 and preclude removing the plug from either end thereof.

Swivelly carried by the plug 24 is a co-axial drill or other appropriate cutting tool 36 for tapping main 18 and having a shank 38 rotatably carried in an axial bore 40 of plug 24. The upper end of shank 38 projects into a noncircular, e.g., hexagonal, counterbore or socket 42 in the upper or outer end of the plug 24, and the shank 38 of the drill 36 is retained in place by a transverse pin 44 bearing against the shoulder 46 formed at the lower or inner end of the counter-bore 42. The upper end of drill shank 38 terminates in a threaded stud 48, while a seal is effected between the drill shank 38 and the plug 24 by means of an O-ring 50 disposed in a circumferential groove 52 in the plug bore 40.

Threaded onto the stud 48 on the drill shank 38 is the shank 60 of a drill-rotating tool 61 having a crank handle 62 on a reduced outer or upper end. Co-axially and rotatably mounted about the shank 60 of the cutting tool rotating tool is a plug wrench 64 having radial handles 66 disposed at its outer end and below crank handle 62. The plug wrench 64, which also is movable longitudinally on the tool shank 60, has a smooth-walled exterior cylindrical surface 68 for the major portion of its length, and an outer reduced non-circular surface 70 at its lower end complementary to and adapted to fit within the non-circular counter-bore 42 in the plug 24. The extreme lower end of plug wrench 64 is provided with a plurality of radially extending notches or kerfs 72 adapted to engage or lockingly receive the transverse pin 44 in the drill shank 38. A seal is effected between the plug wrench 68 and the reduced portion of the shank 60 of the rotating tool 61 by means of an O-ring 74 disposed in a circumferential groove 76 in plug wrench 64, while the exterior cylindrical surface portion 68 of plug wrench 64 is adapted to seal with the O-ring 30 at the outer end of the T through bore 12.

In operation of the device, after the T 10 has been welded to a main 18 (as shown in FIG. 1), a service line 15 is connected to the lateral outlet 14, as by welding, and tested for leaks. Thereafter, the plug wrench 64 is engaged with the plug 24 and rotated to thereby thread the plug through the T along through bore 12 toward the main 18 until the drill or cutting tool 36 comes into contact with the exterior surface of main 18. In this process, it will be seen that the cylindrical portion 68 of the plug wrench 64 seals with the O-ring 30 at the outer end of the through bore 12 (as shown in FIG. 3). The wrench member is then pulled upwardly relative to the tool 61 sufficiently to insure that the notches or kerfs 72 in its lower end are out of engagement with the transverse pin 44 in drill shank 38 (in the position shown in FIG. 1). Thereupon, the tool 61 is turned by means of the crank arm 62 to rotate the drill or circular saw 36 to cut an opening in the main 18 (as shown in FIG. 3). The drill or cutting tool 36 is fed forwardly during the cutting or tapping operation by continuing to screw the plug 24 toward the main 18 by means of the plug wrench 64.

After the hole has been cut in the main 18 and the T 10 and its associated plug 24 and turning tools 61 and 64 are in the position shown in FIG. 3, sealing O-ring 50 provides a fluid-tight seal between the shank 38 of the drill 36 and the plug 24. In addition to this, O-ring 30 is in sealing engagement with the upper end of through bore 12 and the outer cylindrical portion 68 of the plug wrench 64 while the O-ring 74 provides a seal between the two rotating tools. It will thus be seen that when the main has been tapped, it is impossible for the fluid under pressure carried thereby to escape through the T through bore 12 and thus cause any possibility of a dangerous condition arising through the escape of gas under pressure. By using the device of the present invention it is readily apparent that the complex apparatus previously utilized in the tapping of a main and the installation of a service T thereon has been eliminated.

After the hole has been cut in the main 18, rotation of the plug wrench 64 is reversed to thereby unscrew the plug 24 upwardly and outwardly to the position shown in FIG. 4, to thereby establish service between the main 18 and the lateral outlet 14 in the T 10. At the same time, the plug 24 seals with the O-ring 30 at the outer or upper end of the T through bore 12, in which position O-ring 30 is in engagement with the smooth-walled cylindrical portion 28 of the plug. Plug wrench 68 is then pushed inwardly or downwardly until the notches or kerfs 72 in its forward or lower end make locking engagement with the transverse pin 44 on drill shank 38. Plug wrench 64 and cutting tool rotating tool 61 can then be relatively rotated in a direction to unscrew the rotating tool 61 from the threaded stud 48 on drill shank 38, so that both the plug wrench 64 and the tool 61 can be completely detached and removed from the T 10. After the aforementioned rotating tool and wrench have been removed from the T 10, the latter may be provided with a closure cap 80 (FIG. 4) in a conventional manner.

It will be seen that the plug wrench 64 can be used at any time to screw the plug 24 down into engagement with the valve seat 22 to shut off the service. It also will be seen that the principles of the present invention can be embodied in a plastic self-tapping service T.

It will thus be seen that there has been provided by this invention a device in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

1. A fitting attachable to a main comprising: a one-piece service T having a throughbore and a lateral outlet, said throughbore being provided with interior straight threads for a major portion of its length and the inlet end of said T being adapted to be secured to a main; an exteriorly threaded plug of a length not appreciably greater than that section of said bore which extends between said lateral outlet and the other end of said T, said plug being engaged with said bore threads for movement along said bore on rotation of said plug; a cutting tool of smaller diameter than and swivelly carried by said plug for cutting a hole in a main, said tool having a reduced shank extending through a bore in said plug; and noncircular shank-retaining means on the outer end of said shank.

2. The structure defined in claim 1 including a seal between the plug and the tool.

3. A fitting attachable to a main comprising: a one-piece service T having a throughbore and a lateral outlet, said throughbore being provided with interior straight threads for a major portion of its length and the inlet end of said T being adapted to be secured to a main; an exteriorly threaded plug of a length not appreciably greater than that section of said bore which extends between said lateral outlet and the other end of said T, said plug being engaged with said bore threads for movement along said bore on rotation of said plug; a cutting tool of smaller diameter than and swivelly carried by said plug for cutting a hole in a main, said tool having a shank projecting from the outer end of said plug; means on the outer end of said shank for engagement by a turning tool; and noncircular means on the outer end of said plug for engagement by a plug-rotating wrench.

4. The structure defined in claim 1 in which the means on the shank includes threads and noncircular means on the outer end of said shank for engagement by complementary means on the inner end of the wrench to restrain said shank against rotation while the turning tool is being disengaged from said threads.

5. The structure defined in claim 1 in which the noncircular means on the plug comprises a noncircular socket.

6. The structure defined in claim 1 in which the means on the outer end of the shank includes exterior threads.

7. The structure defined in claim 1 including a seal at the other end of the throughbore engageable with the plug when the latter is at said end and also engageable by the wrench as the latter rotates said plug to move the latter along said throughbore.

8. Apparatus for connecting a service pipe to a main comprising: a service T having a throughbore and a lateral outlet, said throughbore being provided with interior threads for a major portion of its length and the inlet end of said T being adapted to be secured fluid-tight to a main; an exteriorly threaded plug engaged with said bore threads for movement along said bore on rotation of said plug; a cutting tool rotatably carried by said plug for cutting a hole in a main; a wrench for rotating plug detachably engaged with the outer end thereof and having a shank portion receivable within said throughbore; and a rotating tool coaxial with and rotatable relative to said plug wrench and detachably engaged with the outer end of said cutting tool for rotating the latter.

9. The structure defined in claim 8 including a seal between the cutting tool and the plug; a seal at the other end of the throughbore for engagement by said plug when the latter is at said other end and also for engagement by the wrench during its movements to rotate, and thus move, said plug along said throughbore; and a seal between said wrench and the rotating tool.

10. The structure defined in claim 8 in which the cutting tool has a threaded shank for engagement by complementary threads on the rotating tool and also noncircular means for engagement by the wrench.

11. Apparatus for connecting a service pipe to a main, comprising: a service T having a throughbore and a lateral outlet, said throughbore having interior threads for a major portion of its length and the lower end of said T being adapted to be secured fluid-tight to a main; an exteriorly threaded plug engaged with said threads of said throughbore for movement therealong on rotation of said plug; a cutting tool swively carried by said plug for cutting a hole in a main, and having a threaded shank; a non-circular socket in the upper end of said plug; a plug wrench having an end complementary to and detachably engaged in said plug socket and having a shank portion receivable within said throughbore; a turning tool coaxial within and rotatably carried by said plug wrench for limited movement axially of the latter, said turning tool having threads on one end thereof detachably engaged with said threaded shank of said cutting tool; and sealing means disposed between said plug wrench and said turning tool.

12. The structure defined in claim 11 including noncircular interengageable means on the plug wrench and on the cutting tool shank, whereby the cutting tool may be restrained against rotation as the turning tool is connected thereto and disconnected therefrom.

13. A turning tool assembly for use with a service T having a threaded throughbore, a plug threadedly engaged therewithin for movement therealong, and a main cutting tool rotatably carried by the plug, comprising: a tubular plug wrench of smooth uniform cylindrical exterior configuration for a major portion of its length for sealing engagement with a circular seal at the mouth of the bore in the T, and having a noncircular exterior portion at one end for detachable engagement within a noncircular socket in the plug; a turning tool swively carried within said wrench for limited movement longitudinally thereof, said tool having means at one end thereof for detachable driving engagement with the main-cutting tool carried by the plug; and a seal between said wrench and said turning tool.

14. The structure defined in claim 13 in which the engageable means on the turning tool includes threads for engagement with complementary threads on the cutting tool, and wherein the one end of the plug wrench is provided with noncircular means adapted for detachable engagement with complementary noncircular means on the cutting tool in order to restrain rotation thereof while the turning tool is being threadedly connected or disconnected therefrom.

References Cited in the file of this patent

UNITED STATES PATENTS

| | | |
|---|---|---|
| 511,327 | Eley | Dec. 26, 1893 |
| 2,226,005 | Lodge | Dec. 24, 1940 |
| 2,950,637 | Merrill et al. | Aug. 30, 1960 |

FOREIGN PATENTS

| | | |
|---|---|---|
| 765,332 | France | Mar. 19, 1934 |